Oct. 20, 1925.
C. E. ANDERSON
1,557,958
FLEXIBLE COUPLING
Filed Aug. 26, 1924
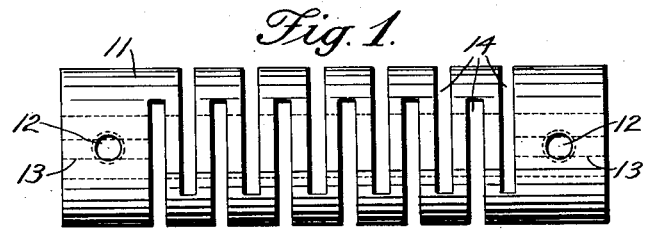
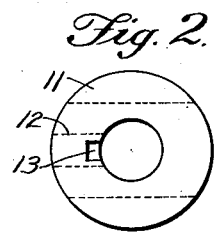
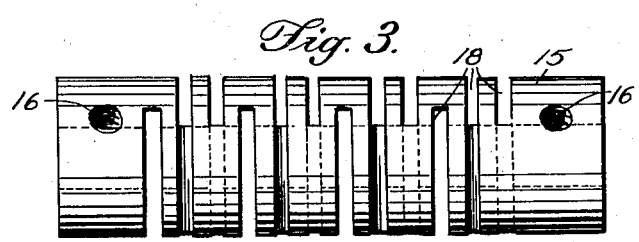
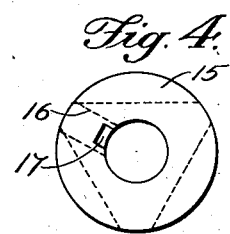
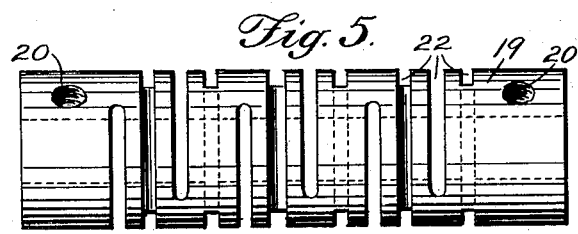
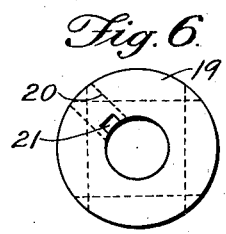
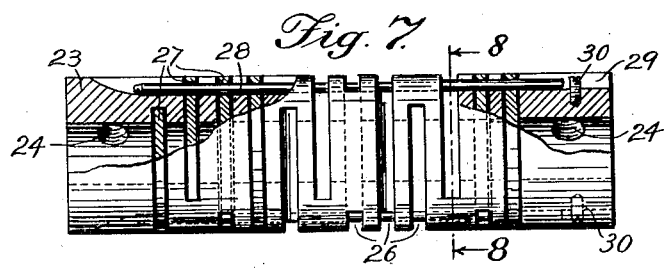
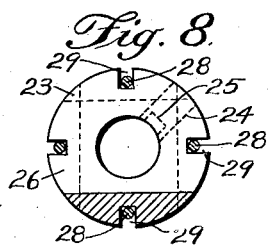
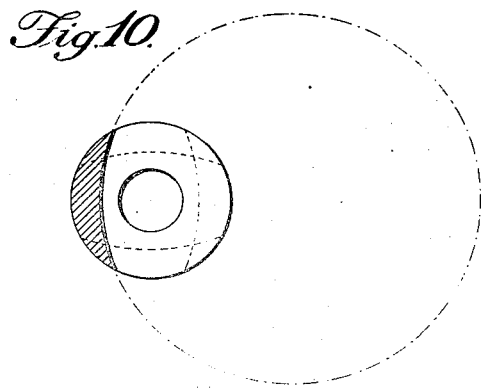
INVENTOR.
Carl E. Anderson
BY
Sydney Prescott
ATTORNEYS.

Patented Oct. 20, 1925.

1,557,958

UNITED STATES PATENT OFFICE.

CARL E. ANDERSON, OF BROOKLYN, NEW YORK, ASSIGNOR TO AMERICAN MACHINE AND FOUNDRY COMPANY, A CORPORATION OF NEW JERSEY.

FLEXIBLE COUPLING.

Application filed August 26, 1924. Serial No. 734,188.

*To all whom it may concern:*

Be it known that I, CARL E. ANDERSON, a citizen of the United States, residing at Brooklyn, county of Kings, and State of New York, have invented a new and useful Improvement in Flexible Couplings, of which the following is a specification.

This invention relates to an improved flexible coupling, and it has for its main object the production of a simple and inexpensive coupling of this type which is capable of use where the angularity of the axes of the driving and driven shafts is but slightly variable. With this and other objects not specifically mentioned in view, the invention consists in certain constructions and combinations which will be hereinafter fully described and then specifically set forth in the claims hereunto appended.

In the accompanying drawings which form a part of this specification and in which like characters of reference indicate the same or like parts, Fig. 1 is a plan view of a coupling constructed in accordance with the invention, Fig. 2 is an end elevation of the structure shown in Fig. 1, Fig. 3 is a plan view of a modified form of coupling, Fig. 4 is an end elevation of the structure shown in Fig. 3, Fig. 5 is a plan view of another modified form of coupling, Fig. 6 is an end elevation of the structure shown in Fig. 5, Fig. 7 is a plan view, partly in section, of still another modified form of coupling, Fig. 8 is a cross sectional view on the line 8—8 in Fig. 7, Fig. 9 is a detail view of one of the segments employed in the form of coupling shown in Figs. 7 and 8, and Fig. 10 is a diagrammatic view showing one way of cutting the slots in either of the forms of couplings shown in the other views.

In carrying the invention into effect, there is provided a sleeve adapted to be secured to adjacent ends of a driving shaft and a driven shaft, and provided with a series of transverse slots in relatively angular disposition about its perimeter. In its simplest form, this coupling consists of a single piece which can be easily machined.

Referring to Figs. 1 and 2 of the drawings, 11 indicates an axially bored sleeve provided with set screw apertures 12 and keyways 13, whereby the sleeve may be secured to adjacent ends of a driving shaft and a driven shaft not shown. The sleeve is further provided with a series of transverse slots 14 which are cut in its midsection and which so weaken the sleeve that it is made flexible to a limited degree.

Referring to Figs. 3 and 4, 15 indicates a similar sleeve provided with set screw apertures 16 and keyways 17, with transverse slots 18, the latter being differently disposed about the perimeter of the sleeve.

Referring to Figs. 5 and 6, 19 indicates a similar sleeve provided with set screw apertures 20 and keyways 21, with transverse slots 22, the latter being disposed about the perimeter of the sleeve in still another manner.

Referring to Figs. 7 and 8, 23 indicates a similar sleeve provided with set screw apertures 24 and keyways 25, with transverse slots 26, the latter being differently disposed about the perimeter of the sleeve in still another manner. In this construction, however, a series of segments 27 are loosely mounted in some of the transverse slots 26, and a series of pins 28 engage the segments and suitable longitudinal recesses 29 in the perimeter of the sleeve, the purpose of this mechanism being to transmit motion under a heavier load than is possible without the same.

In all of the various modifications shown, the degree of flexibility depends upon the width and depth of the transverse slots, their distance apart longitudinally, and on their angular disposition about the perimeter of the sleeve, and these factors may be varied without departure from the invention. The slots may be cut from 2, 3, 4, or more different directions, and they may be cut successively, advancing by one of these different directions, or in any other order. Thus, in Figs. 1 and 2, the angular disposition or distance between successive slots is 180°; in Figs. 3 and 4 it is 120°; and in Figs. 5 to 8 inclusive it is 90°. In Figs. 5 and 6 they are cut in successive order, each succeeding slot differing by 90° from the preceding one; while in Figs. 7 and 8 they are cut non-successively, the first two slots differing by 180°, the second and third slots being 90° apart, and the third and fourth slots again differing by 180°, and so on. The slots may be cut with sharp corners as in Figs. 1 and 3, or they may be cut with rounded edges as shown in Fig. 5.

In cases where considerable power is to be transmitted through the coupling, the torsional strain may in part be taken up by the segment and pin construction shown in Figs. 7 and 8, but the thickness of the segments must be sufficiently less than the width of the slots, and the pins must have enough clearance both in the holes in the segments and in the longitudinal recesses of the sleeve to permit the desired limited flexibility of the coupling as a whole. The pins in this construction serve as driving members, augmenting the driving power of the slotted sleeve itself.

To hold the driving pins 28, which in the rest position of the coupling are quite loose, the longitudinal recesses 29 are closed at one end by the out-running of the recessing cutter used, and at the other by means of a small screw 30.

In manufacture from solid stock, maximum strength of the coupling will be obtained by so arranging the work that the grain of the steel runs crosswise.

Changes and variations may be made in the construction of the coupling within the scope of the claims. The invention, therefore, is not to be restricted to the precise details of the limited number of possible structures shown and described.

What is claimed is:

1. A flexible coupling comprising a sleeve provided with a series of transverse slots in relatively angular disposition about its perimeter, a series of segments loosely mounted in some of said slots, and a series of pins engaging said segments and said sleeve.

2. A flexible coupling comprising a sleeve provided with a series of transverse slots in relatively angular disposition about its perimeter and deep enough to intersect the axis of the sleeve, a series of segments loosely mounted in some of said slots, and a series of pins engaging said segments and said sleeve.

In testimony whereof, I have signed my name to this specification.

CARL E. ANDERSON.